UNITED STATES PATENT OFFICE.

PAUL EMILE PLACET, OF PARIS, FRANCE.

BRASQUING OF CRUCIBLES OR LINING OF FURNACES.

SPECIFICATION forming part of Letters Patent No. 589,221, dated August 31, 1897.

Application filed December 24, 1896. Serial No. 616,919. (No specimens.) Patented in France July 24, 1896, No. 258,323.

*To all whom it may concern:*

Be it known that I, PAUL EMILE PLACET, of Paris, in the Republic of France, have invented a new and useful Improvement in the Brasquing of Crucibles or Lining of Furnaces, (for which I have obtained a patent in France, No. 258,323, dated July 24, 1896,) of which the following is a specification.

Sesquioxid of chromium is one of the most refractory bodies. It is also one of the bodies the least soluble in silicates. It therefore results that it resists perfectly the corrosive actions of melted metals and dross. My invention consists in utilizing this substance for the brasquing of crucibles and the lining of smelting and other furnaces, but I do not employ it in the state of oxid formed in advance. I have found it to be better, more convenient, and much more advantageous to employ salts or compounds of chromium which in melting and in being decomposed by heat leave on the surface and in the thickness also of crucibles and furnaces sesquioxid of chromium very adherent and very resistant. I obtain this result by employing notably the bichromates of magnesia, of lime, and of alumina, bichromates of potassa, of soda, and of ammonia, azotate of chromium, chromic acid, and all the compounds of chromium, which alone or mixed together or in admixture with reducing bodies leave as residue after calcination sesquioxid of chromium, pure or mixed with other refractory matters.

The operation of brasquing crucibles and lining furnaces with these salts of chromium may be performed in many ways. For example, bichromate of potassa may be melted in the crucible which it is desired to brasque, agitating the crucible in such manner as to well coat its interior with the melted salt, then calcining to a red heat. There is thus obtained a beautiful green coating of sesquioxid of chromium, very adherent, lining the interior of the crucible. Moreover, the crucible thus lined is not porous. It is impermeable, which is very advantageous in many cases in which it is necessary to treat in crucibles matters which are quite liquid.

Another method is to simply heat the crucible which it is desired to brasque, and when it is sufficiently heated to roll it in powdered bichromate, afterward calcining, as above described.

A crucible may also be brasqued by treating it with a concentrated solution of bichromate of magnesia, bichromate of lime, bichromate of alumina, or chromic acid, either by dipping the crucible into this solution or else pouring the solution into the crucible, allowing the solution to deposit itself for a few minutes, then pouring out the excess thereof. In this way there may be prepared in a very short time a large number of crucibles, which may be calcined when they are to be used.

Another way is to take the bichromate or other salt of chromium in powder and mix it with tar, molasses, albumen, oil, &c., and make a more or less liquid paste, which may be applied with a brush or trowel upon the surfaces which it is desired to coat with sesquioxid of chromium. This may be allowed to dry and afterward be calcined.

The bichromates in powder or in solution may be mixed with refractory substances—such as magnesia, lime, dolomite, alumina, asbestos, &c.—and fluxes—such as chlorids, fluorids, cryolites, phosphates, boric acid, &c.—applying these mixtures by any of the means above described and afterward calcining. These mixtures may also serve as cement for the construction and repair of furnaces.

Crucibles previously brasqued in the ordinary way with charcoal, magnesia, lime, alumina, &c., become much more solid and much more resistant when they are afterward coated with sesquioxid of chromium by any of the methods hereinabove indicated.

The lining of Bessemer converters and furnaces of all sorts, even electric furnaces, muffles, earthenware tubes for chemistry, refractory bricks, any objects whatever of earthenware or metal which require to be covered with refractory matters—such as pouring-ladles, furnace-doors, puddling or stoking irons, boiler-tubes, &c.—gain much in solidity and in resisting quality when coated with the salt of chromium which is transformed by heat into sesquioxid of chromium.

The concentrated solutions of bichromate of magnesia, lime, alumina, &c., may even be injected into very narrow vent-holes of certain furnaces to render them very resistant.

What I claim as my invention is—

The within-described process for the brasquing of crucibles and lining of furnaces or earthen structures for the purpose of rendering them refractory, consisting in applying to the surfaces of such articles and structures compounds of chromium which are decomposed by heat and substantially free of other ingredients, such as bichromates of magnesia, lime, alumina and potassa and chromic acid, and heating and thereby producing upon the said surfaces and even in the body of such articles and structures, a very adherent and refractory coating or lining of sesquioxid of chromium.

In witness whereof I have hereunto set my hand in the presence of two subscribing witnesses.

PAUL EMILE PLACET.

Witnesses:
J. ALLISON BOWEN,
ALCIDE FABE.